United States Patent
Pires et al.

(10) Patent No.: US 8,404,295 B2
(45) Date of Patent: Mar. 26, 2013

(54) METHOD AND DEVICE FOR PROCESSING FERMENTED MILK PRODUCTS

(75) Inventors: Ricardo Pires, Munich (DE); Harald Winterwerber, Aiglsbach (DE); Reinhard Bohme, Teugn (DE); Sebastian Kramer, Freising (DE)

(73) Assignee: Molkerei Alois Muller GmbH & Co. KG, Aretsried (DE)

( * ) Notice: Subject to any disclaimer, the term of this patent is extended or adjusted under 35 U.S.C. 154(b) by 302 days.

(21) Appl. No.: 12/822,955

(22) Filed: Jun. 24, 2010

(65) Prior Publication Data
US 2010/0330231 A1 Dec. 30, 2010

(30) Foreign Application Priority Data
Jun. 25, 2009 (DE) .......... 10 2009 030 459

(51) Int. Cl.
*A23L 1/025* (2006.01)
(52) U.S. Cl. ........ 426/491; 426/478; 426/519; 426/580; 426/583
(58) Field of Classification Search .................. 426/580, 426/478, 491, 519, 583
See application file for complete search history.

(56) References Cited

U.S. PATENT DOCUMENTS
5,707,517 A * 1/1998 Rolchigo et al. ............ 210/232

FOREIGN PATENT DOCUMENTS
| CH | 238115 A | 6/1945 |
| DE | 2633645 A1 | 2/1977 |
| DE | 2752751 A1 | 6/1978 |
| FR | 958314 A | 3/1950 |
| GB | 1508252 A | 4/1978 |
| GB | 1564485 A | 4/1980 |
| WO | WO2007095969 A1 | 8/2007 |

\* cited by examiner

*Primary Examiner* — Helen F Heggestad
(74) *Attorney, Agent, or Firm* — Schwabe, Williamson & Wyatt, P.C.

(57) ABSTRACT

The invention concerns a method for processing fermented milk products, in which the milk product passes through processing equipment executed with a plurality of openings from a retentate side toward a permeate side, in which the milk product is forced through the processing equipment with an insert feature preferably moved in a rotating arrangement along a retentate-side boundary surface of the processing equipment.

8 Claims, 2 Drawing Sheets

METHOD AND DEVICE FOR PROCESSING FERMENTED MILK PRODUCTS

CROSS REFERENCE TO RELATED APPLICATIONS

Figure 1:
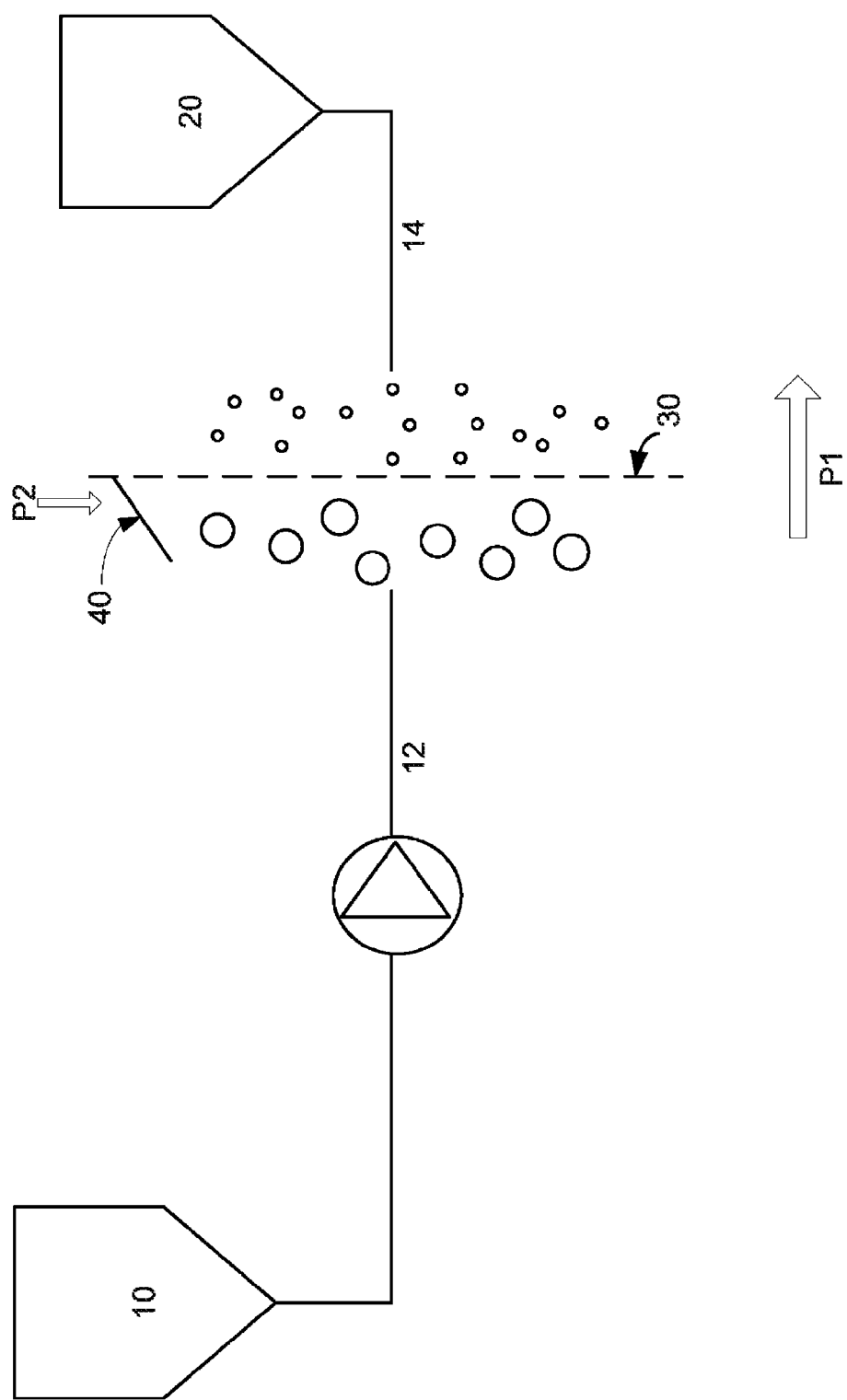

The present application claims international priority under 35 U.S.C. §119 to co-pending German Patent Application No. 102009030459.2 filed 25 Jun. 2009, the entire content and disclosure of which is hereby incorporated by reference in its entirety.

The invention concerns a method for processing fermented milk products, in which the milk product passes through processing equipment executed with a plurality of openings directed from a retentate side toward a permeate side and a device that can be used to carry out such a method.

When fermenting milk, the soluble proteins of the milk are destabilized during the fermentation by the acid formed thereby. What is more, a gel develops. To obtain end products with a desired appearance, a specified texture and stability, it is necessary to crush this gel into small gel particles in order to thus obtain a suspension or colloidal dispersion that has the required product properties for a stirred yogurt, for instance.

The mechanical crushing of the gel particles is usually performed by directed agitation, pumping through slit openings or cloth sieves, or with the aid of a sprocketed dispersion machine. A goal of the corresponding processing of fermented milk products is to thereby obtain an end product with desired optical and sensory properties, such as an particularly smooth end product. Thus the particle-size distribution of the gel particles resulting from crushing the gel has a great influence on the texture, especially the consistency and the suspension stability of the end product.

The optimization of the desired product properties, such as obtaining a particularly smooth end product and the maximum textural output, that is, the optimum use of the fermented milk product, depends to a large extent on the devices and method used to crush the gel particles. With regard to the desired product properties, it is especially advantageous to adjust the particle-size distribution obtained to be as narrow as possible by means of the processing and to select the largest possible average particle size. At the same time, the average particle size is usually adjusted in a reasonable compromise between the desired product properties (a smooth product) and textural output.

Using conventional methods and devices for crushing gel particles often leads to unsatisfactory product properties or to additional expenditure on milk proteins or binding agents. For example, end products are often obtained which occasionally contain optically visible gel particles. In other cases, such as when using cloth sieves, non-uniform product properties are observed due to blockages or surface film formation.

In view of the problems in prior art described above, the object of the invention is based on making a method available for processing fermented milk products with which desired product properties can be attained without excessive expenditure and on disclosing suitable devices for performing the corresponding method.

According to the invention, this problem is solved in terms of the process by a further development of the known method, which is essentially characterized in that the milk product is forced through the processing equipment by sliding means moving preferably in sliding engagement along a retentate-side boundary surface of the processing equipment.

In the process according to the invention, small particles of the fermented milk product to be processed pass through the openings in the processing equipment unimpeded, while large particles are forced gently through the openings in the processing equipment by the sliding means. At the same time, the openings are kept continuously clear as a result of the movement of the sliding means along the retentate side. In this connection, the sliding means moves preferably in sliding engagement along the retentate side of the processing equipment, so as to achieve a particularly effective cleaning of the openings in the processing equipment.

The invention thereby originates from the discovery that the problems that are observed in prior art are attributed to too large or non-uniform slit or pore widths or too high a mechanical stress on the gel particles. Surprisingly, it is found that through the use according to the invention of an insert feature movable along the retentate side of the processing equipment, very much smaller pore sizes, compared to using cloth sieves, are needed to attain the desired product properties and a smooth appearance, so that these desired properties can be obtained with a simultaneous guarantee of satisfactory textural output.

The combination according to the invention of the processing equipment exhibiting openings permeable to fermented milk products with the mechanical insert feature therefrom makes use of the fact that the filter surface film usually occurring at filters or the sedimentation layer or filter cake, with corresponding porosity and sedimentation resistance arising therefrom, are removed or stripped off, so that no filter cake development occurs, and consequently only the geometry of the openings in the processing equipment affects the particle size and distribution.

In the course of processing fermented milk products according to the invention, the gel suspension obtained during the fermentation is forced through the processing equipment. At the same time, the larger particles collect at the openings and, due only to their lesser strength, are shoved through the openings with the aid of the insert feature and, thus directed, are crushed In contrast to the known methods, the maximum particle size can be affected by the method defined according to the invention and the following advantages are presented.

Since the formation of the filter cake is counteracted, particle crushing can be carried on continuously with constant quality for several hours without needing to replace or clean the processing equipment, because when using the insert feature, it does not lead to the formation of a sedimentation layer, as occurs with the conventional method. The maximum particle size can be especially adjusted through the selection of opening sizes in the specific processing equipment, and it can be kept in continual operation for several hours. As a result, the average particle size can be maximized taking the sensory limits into account, in order to thus also improve the possible manufacture of microgel suspensions in the textural output with the method according to the invention.

The energy input, the shear strength, and consequently the mechanical load of the quite delicate gel particles are reduced by using an insert feature according to the invention, so that more serum can be bound in the individual particles and each individual gel particle consequently retains its maximum volume, which comes from gel formation during the fermentation. The spread of the particle-size distribution can be reduced, which leads to a more homogeneous suspension. This also has the result that the maximum packing density of the suspension is reduced, which then leads to a higher viscosity. It also contributes to improvement in the textural output.

In using the method according to the invention, optically visible and, under certain circumstances, larger particles perceptible to the senses, which appear with conventional methods, can be more dependably excluded. The stability of the suspension and of the end product is positively affected, depending on the raw material. It is found, in comparison to conventional methods that, due to increased homogeneity of the suspension and restriction in maximum particle size when using the method according to the invention, that no perceptible sedimentation of larger particles occurs in the end product.

With regard to the dependable detachment of particles being taken up on the retentate side of the processing equipment while simultaneously avoiding excessive mechanical stress on these particles, it has proved to be favorable if the insert feature, in forming a wedge-shaped slit, which becomes narrower in a direction opposite to the movement of the insert feature, is moved between a boundary surface of the insert feature which faces the processing equipment and the retentate-side boundary surface of the processing equipment along the retentate-side boundary surface. In the course of this movement, the particles to be forced through the processing equipment come from an area with a large slit width between the insert feature and the processing equipment in the process of the insert feature moving into an area with a smaller slit width, so that upon reaching a slit at which a sufficiently large force is made available to the particles to force them through the openings in the processing equipment, passage though the openings in the processing equipment results without more force being used for this than is absolutely necessary.

With regard to dependably avoiding the formation of a filter cake on the processing equipment with a simultaneous guarantee of gentle treatment of the fermented milk product to be processed, it has proved favorable if the retentate-side boundary surface of the processing equipment is swept at a frequency of 0.05 to 2 Hz, especially 0.1 to 1 Hz, by the insert feature. Two or more insert elements of the insert feature can thereby each come into use at a lower frequency over the retentate-side boundary surface of the processing equipment.

To obtain a homogeneous final product, it has proven advantageous for the processing equipment to comprise a preferably rigid element, which is perforated by a plurality of openings of predefined size and geometry. The advantage of using of a rigid element as the processing equipment that is perforated by the openings is that, with the sliding engagement of the sliding means on the processing equipment, defined force ratios can be established, preventing the application of excessive force to the gel particles. Within the scope of the invention, for example, simple perforated sheets can be used as the processing equipment. In terms of obtaining homogeneous product properties, it has proven expedient for the openings of the processing equipment to be embodied as essentially circular and having a uniform diameter, wherein said opening diameter can measure 15 to 400 µm, particularly 30 to 200 µm.

As may be gathered from the preceding explanation of the method according to the invention, a device according to the invention for carrying out such a method is essentially distinguished by processing equipment permeable to fermented milk products from a retentate side toward a permeate side by virtue of it exhibiting an insert feature movable along the retentate side and which forces the milk product in a direction toward the permeate side. At the same time, the insert feature can include an insert element, which during movement along the retentate side forms a slit which becomes narrower in a direction opposite to the direction of movement between a retentate-side boundary surface of the processing equipment and the insert feature.

But the processing equipment can exhibit a rigid body, such as a perforated plate executed with openings of predetermined size and geometry, in which the openings can be executed in an essentially cruciform shape with uniform diameter and the opening diameter is 15 to 400 µm, especially 30 to 200 µm.

The invention is clarified below with reference to the drawings, to which all the details essential to the invention and not further presented in the description are explicitly referred. The drawings show:

FIG. 1 a schematic representation of a first embodiment of the invention and

Figure 2:
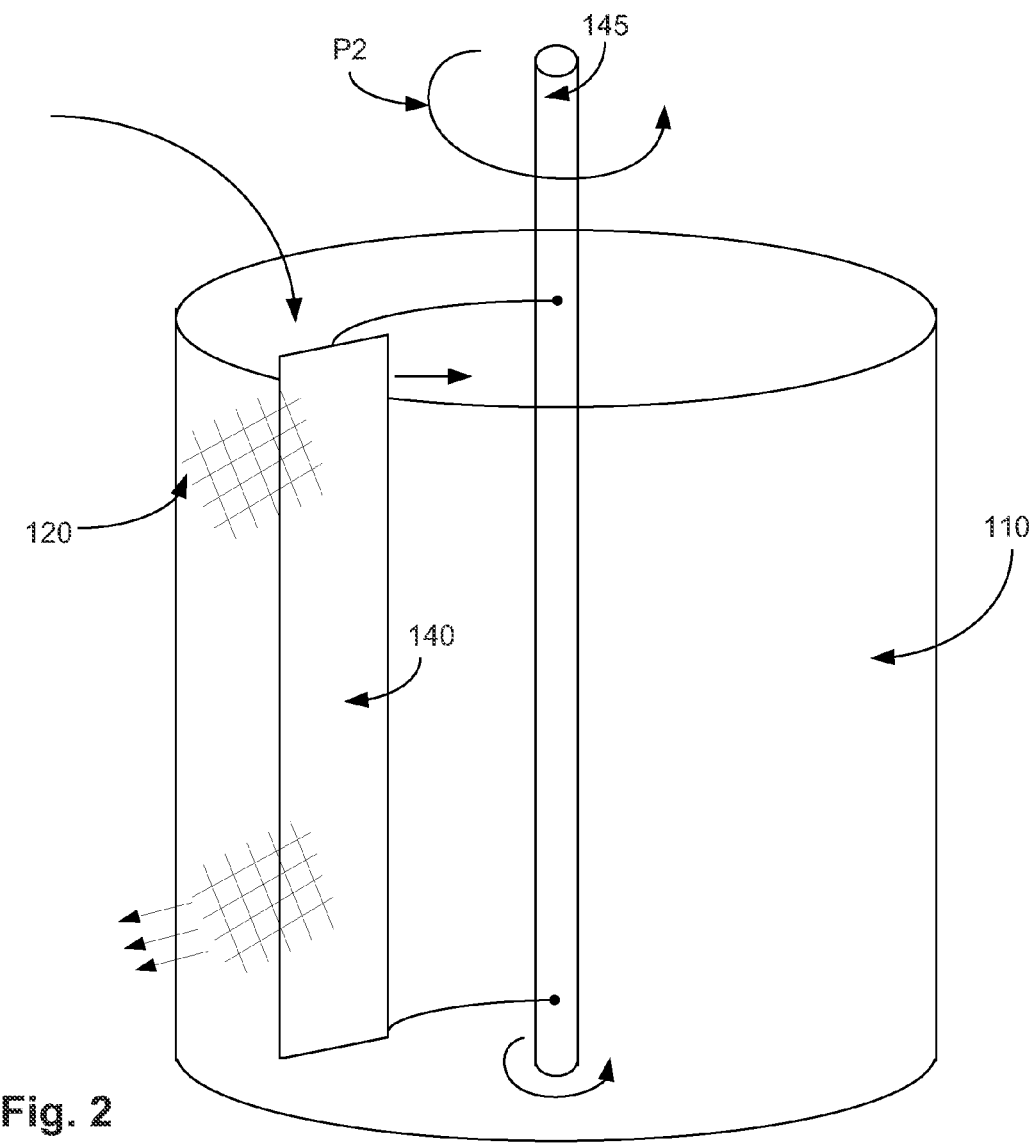

FIG. 2 a schematic representation of a second embodiment of the invention.

In the embodiment of the invention illustrated in FIG. 1, a fermented milk product is pumped from a storage tank 10 through a line 12 in the direction of flow indicated by the arrow P1, toward processing equipment in the form of a perforated sheet 30 equipped with pores. Once it has passed through the perforated sheet 30, the fermented milk product is conductive via the line 14 to a collection tank 20. In the embodiment of the invention illustrated in FIG. 1, the fermented milk product is forced through the perforated sheet 30 by means of a sliding plate 40, which is movable in sliding engagement along the perforated sheet 30 as indicated by the arrow P2. To this end, the sliding plate 40 is embodied such that a wedge-shaped space that is tapered in a direction opposite to the direction of movement P2 of the sliding plate 40 is formed between the perforated sheet 30 and the sliding plate 40. As a result, a gentle processing of the fermented milk product is facilitated, as has already been described above.

In the embodiment of the invention illustrated in FIG. 2, the fermented milk product is held in a storage tank 110, the outer surface of which is formed by a semicircular basket 120. To process the fermented milk product, said product is forced through the semicircular basket by means of a sliding plate 140 that is moved in sliding engagement along the inner boundary surface of the semicircular basket 120. In this case, the sliding plate revolves around a shaft axis 145 in the direction indicated by the arrow P2 in such a way that a wedge-shaped space that is tapered in a direction opposite the direction of movement of the sliding plate 140 is formed between the sliding plate 140 and the semicircular basket 120. Once it has passed through the semicircular basket 120, the milk product is again conveyed to a storage, not illustrated in FIG. 2.

The invention is not limited to the embodiments depicted by the drawings. Rather, it can also imagined, in using the insert feature, with two, three, or more insert plates, which could each be mounted onto an insert shaft.

The invention claimed is:

1. A method for processing fermented milk products, in which the milk product passes through processing equipment that is, perforated with a plurality of openings, a retentate side towards a permeate side of the processing equipment, characterized in that the milk product is forced through the plurality of openings of the processing equipment by sliding means moving in sliding engagement along a retentate-side boundary surface of the processing equipment.

2. A method according to claim 1, wherein the sliding means, in forming a wedge-shaped slit, which becomes narrower in a direction opposite to the motion of the sliding means, is moved between a boundary surface of the sliding means which faces the processing equipment and the retentate-side boundary surface of the processing equipment along the retentate-side boundary surface.

3. A method according to claim 1, wherein the retentate-side boundary surface of the processing equipment is swept at a frequency of 0.05 to 2 Hz by the sliding means.

4. A method according to claim 3, wherein the retentate-side boundary surface of the processing equipment is swept at a frequency of 0.1 to 1 Hz by the sliding means.

5. A method according to claim 1, wherein the processing equipment includes a rigid body perforated with the plurality the openings having a openings of predetermined size and geometry.

6. A method according to claim 5, wherein the openings have an essentially circular shape with uniform diameter.

7. A method according to claim 6, wherein a diameter of the openings is 15 to 400 μm.

8. A method according to claim 7, wherein the diameter of the openings is 30 to 200 μm.

* * * * *